(12) United States Patent
Wu

(10) Patent No.: US 11,606,718 B2
(45) Date of Patent: Mar. 14, 2023

(54) METHOD AND DEVICE FOR DATA TRANSMISSION, AND STORAGE MEDIUM

(71) Applicant: BEIJING XIAOMI MOBILE SOFTWARE CO., LTD., Beijing (CN)

(72) Inventor: Zhe Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 66 days.

(21) Appl. No.: 17/146,431

(22) Filed: Jan. 11, 2021

(65) Prior Publication Data

US 2021/0377796 A1     Dec. 2, 2021

(30) Foreign Application Priority Data

May 28, 2020   (CN) .......................... 202010468382.6

(51) Int. Cl.
*H04W 4/00*      (2018.01)
*H04W 28/06*     (2009.01)
*H04W 4/80*      (2018.01)
*H04L 47/36*     (2022.01)
*H04L 69/16*     (2022.01)

(52) U.S. Cl.
CPC ............. *H04W 28/06* (2013.01); *H04L 47/36* (2013.01); *H04L 69/16* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 9,640,061 B1* | 5/2017 | Klimanis | ................ G08B 25/10 |
| 2013/0176854 A1* | 7/2013 | Chisu | ..................... H04W 80/06 370/241 |

(Continued)

FOREIGN PATENT DOCUMENTS

| | | |
|---|---|---|
| CN | 101499827 A | 8/2009 |
| CN | 102291318 A | 12/2011 |

(Continued)

OTHER PUBLICATIONS

Yoon Wondeuk et al: "Transfer IPv6 packets over Bluetooth Low Energy with ensuring emergency data transmission",2016 IEEE Sixth International Conference on Communications and Electronics (ICEE), IEEE,Jul. 27, 2016(Jul. 27, 2016),p. 136-141,XP032958300,DOI:10.1109/CCE.2016.7562626,[retrieved on Sep. 7, 2016], section III.

(Continued)

*Primary Examiner* — Bob A Phunkulh
(74) *Attorney, Agent, or Firm* — Syncoda LLC; Feng Ma

(57) ABSTRACT

A method for data transmission includes: during Bluetooth communication, negotiating, by transmitting a sounding data packet at a data size which is a candidate value of a maximum transmission unit (MTU), with a second electronic device about an applied value of the MTU for the Bluetooth communication. Through the technical solution according to embodiments of the disclosure, MTU sounding is performed by sending a data packet during data transmission between Bluetooth devices. Through the MTU negotiation between the two parties of interaction, an appropriate and stable MTU value is finally obtained to serve as a standard parameter of the interaction.

13 Claims, 8 Drawing Sheets

(56) References Cited

U.S. PATENT DOCUMENTS

| | | | | |
|---|---|---|---|---|
| 2016/0374133 | A1* | 12/2016 | Logue | H04W 76/14 |
| 2017/0086098 | A1* | 3/2017 | Kwon | H04L 47/27 |
| 2017/0353935 | A1 | 12/2017 | Xiang et al. | |
| 2018/0278535 | A1* | 9/2018 | Kyou | H04W 28/06 |
| 2022/0210675 | A1* | 6/2022 | Cui | H04W 36/0088 |

FOREIGN PATENT DOCUMENTS

| | | |
|---|---|---|
| CN | 106851622 A | 6/2017 |
| WO | 2017190467 A1 | 11/2017 |

OTHER PUBLICATIONS

Supplementary European Search Report in the European application No. 20217849.7, dated May 25, 2021.

Zhou Xinlei et al., "Analysis and treatment of packet loss caused by equipment docking between transmission network and data network due to improper setting of MTU value", Cable TV Technology, Issue 2, 2019. DOI:10.16045/j.cnki.catvtec.2019.02.028.

Msongaleli, D. L., & Kucuk, K. (2018). "Dynamic future knowledge maximum transmission unit (DFK-MTU) for optic wireless networks". 2018 26th Signal Processing and Communications Applications Conference (SIU). DOI:10.1109/siu.2018.8404326.

* cited by examiner

METHOD AND DEVICE FOR DATA TRANSMISSION, AND STORAGE MEDIUM

CROSS-REFERENCE TO RELATED APPLICATION

This application claims priority to Chinese Patent Application No. 202010468382.6 filed on May 28, 2020, the disclosure of which is hereby incorporated by reference in its entirety.

BACKGROUND

Bluetooth (BT) technology is a global specification for wireless communication of data and voice widely used in various types of electronic devices. Bluetooth technology can realize rapid transmission of a large quantity of data between electronic devices in a short distance, and has the advantages of having low costs, being convenient and efficient, being flexible and safe, having low power consumption, and the like. Two devices involved in Bluetooth communication may have different communication capabilities, and thus may have different maximum limits on a data size of a data packet.

SUMMARY

The disclosure relates to the field of communications, and particularly to a method and device for data transmission, and a storage medium.

A method and device for data transmission, and a storage medium are provided in the disclosure.

According to a first aspect of embodiments of the disclosure, provided is a method for data transmission, applied to a first electronic device, including: during Bluetooth communication, negotiating, by transmitting a sounding data packet at a data size which is a candidate value of a maximum transmission unit (MTU), with a second electronic device about an applied value of the MTU for the Bluetooth communication.

In some embodiments, negotiating, by transmitting the sounding data packet at the data size which is the candidate value of the MTU, with the second electronic device about the applied value of the MTU for the Bluetooth communication includes: sending, according to the candidate value of the MTU, the sounding data packet for the Bluetooth communication to the second electronic device; receiving a feedback data packet from the second electronic device within a preset period of time; and in response to that a data size of the received feedback data packet is equal to that of the sounding data packet, determining the candidate value of the MTU to be the applied value of the MTU for the Bluetooth communication between the first electronic device and the second electronic device.

In some embodiments, negotiating, by transmitting the sounding data packet at the data size which is the candidate value of the MTU, with the second electronic device about the applied value of the MTU for the Bluetooth communication further includes: decrementing the candidate value of the MTU, in response to receiving no feedback data packet at a data size which is equal to that of the sounding data packet; according to the decremented candidate value of the MTU, continuing to negotiate, by transmitting a sounding data packet at the data size which is the decremented candidate value of the MTU, with the second electronic device about the applied value of the MTU for the Bluetooth communication; and stopping negotiation of the MTU, in response to receiving, from the second electronic device, the feedback data packet at the data size which is equal to that of the sounding data packet, or in response to that the candidate value has been decremented to a minimum candidate value of the MTU.

In some embodiments, decrementing the candidate value of the MTU, in response to receiving no feedback data packet at a data size which is equal to that of the sounding data packet includes: in response to receiving, from the second electronic device within the preset period of time, a feedback data packet at a data size which is different from that of the sounding data packet, decrementing the candidate value of the MTU according to the data size of the feedback data packet; or in response to receiving, from the second electronic device within the preset period of time, a feedback data packet at a data size which is different from that of the sounding data packet, decrementing the candidate value of the MTU according to a first predetermined adjustment value.

In some embodiments, decrementing the candidate value of the MTU, in response to receiving no feedback data packet at a data size which is equal to that of the sounding data packet includes: in response to receiving no feedback data packet from the second electronic device within the preset period of time, decrementing the candidate value of the MTU according to a second predetermined adjustment value.

In some embodiments, during the Bluetooth communication, negotiating, by transmitting the sounding data packet at the data size which is the candidate value of the MTU, with the second electronic device about the applied value of the MTU for the Bluetooth communication includes: after data transmission is initiated in the Bluetooth communication, negotiating with the second electronic device about the applied value of the MTU for the Bluetooth communication, by transmitting, at a predetermined interval or at a moment when the data transmission is suspended, the sounding data packet at the data size which is the candidate value of the MTU.

In some embodiments, negotiating, by transmitting the sounding data packet at the data size which is the candidate value of the MTU, with the second electronic device about the applied value of the MTU for the Bluetooth communication further includes: in response receiving no feedback data packet at a data size which is equal to that of the sounding data packet, determining a minimum candidate value to be the applied value of the MTU.

In some embodiments, the method further includes: negotiating with the second electronic device about the candidate value of the MTU before start of the Bluetooth communication.

According to a second aspect of embodiments of the disclosure, provided is a method for data transmission, applied to a second electronic device and including: during Bluetooth communication, receiving a sounding data packet for the Bluetooth communication, wherein the sounding data packet is sent by a first electronic device according to a candidate value of a maximum transmission unit (MTU); and sending a feedback data packet to the first electronic device according to a data size of the sounding data packet, wherein the feedback data packet is used for the first electronic device to determine an applied value of the MTU.

In some embodiments, sending the feedback data packet to the first electronic device according to the data size of the sounding data packet includes: determining whether the data size of the sounding data packet is equal to a predetermined MTU of the second electronic device; and in response to that the data size of the sounding data packet is equal to the predetermined MTU, sending, to the first electronic device, the feedback data packet at a data size which is equal to that of the sounding data packet, wherein the feedback data packet is used for the first electronic device to determine the candidate value of the MTU as the applied value of the MTU for the Bluetooth communication between the first electronic device and the second electronic device.

In some embodiments, sending the feedback data packet to the first electronic device according to the data size of the sounding data packet further includes: in response to that the data size of the sounding data packet is different from the predetermined MTU, sending, to the first electronic device, the feedback data packet at a data size which is smaller than or equal to that of the sounding data packet.

According to a third aspect of embodiments of the disclosure, provided is a device for data transmission, applied to a first electronic device and including: a first negotiation portion, configured to: during Bluetooth communication, negotiate, by transmitting a sounding data packet at a data size which is a candidate value of a maximum transmission unit (MTU), with a second electronic device about an applied value of the MTU for the Bluetooth communication.

In some embodiments, the first negotiation portion includes: a first sending portion, configured to send, according to the candidate value of the MTU, the sounding data packet for the Bluetooth communication to the second electronic device; a first receiving portion, configured to receive a feedback data packet from the second electronic device within a preset period of time; and a first determination portion, configured to: in response to that a data size of the received feedback data packet is equal to that of the sounding data packet, determine the candidate value of the MTU to be the applied value of the MTU for the Bluetooth communication between the first electronic device and the second electronic device.

In some embodiments, the first negotiation portion further includes: a first adjustment portion, configured to: decrement the candidate value of the MTU in response to receiving no feedback data packet at a data size which is equal to that of the sounding data packet; a negotiation sub-portion, configured to: according to the decremented candidate value of the MTU, continue to negotiate, by transmitting a sounding data packet at a data size which is the decremented candidate value of the MTU, with the second electronic device about the applied value of the MTU for the Bluetooth communication; and a stop sub-portion, configured to stop negotiation of the MTU, in response to receiving, from the second electronic device, the feedback data packet at the data size which is equal to that of the sounding data packet, or in response to that the candidate value has been decremented to a minimum candidate value of the MTU.

In some embodiments, the adjustment portion includes: a first adjustment sub-portion, configured to: in response to receiving, from the second electronic device within the preset period of time, a feedback data packet at a data size which is different from that of the sounding data packet, decrement the candidate value of the MTU according to the data size of the feedback data packet; or a second adjustment sub-portion, configured to: in response to receiving, from the second electronic device within the preset period of time, a feedback data packet at a data size which is different from that of the sounding data packet, decrement the candidate value of the MTU according to a first predetermined adjustment value.

In some embodiments, the adjustment portion includes: a third adjustment sub-portion, configured to: in response to receiving no feedback data packet from the second electronic device within the preset period of time, decrement the candidate value of the MTU according to a second predetermined adjustment value.

In some embodiments, the first negotiation portion is configured to: after data transmission is initiated in the Bluetooth communication, negotiate with the second electronic device about the applied value of the MTU for the Bluetooth communication, by transmitting, at a predetermined interval or at a moment when the data transmission is suspended, the sounding data packet at the data size which is the candidate value of the MTU.

In some embodiments, the first negotiation portion further includes: a first determination sub-portion, configured to: in response receiving no feedback data packet at a data size which is equal to that of the sounding data packet, determine a minimum candidate value to be the applied value of the MTU.

In some embodiments, the device further includes: a second negotiation portion, configured to negotiate with the second electronic device about the candidate value of the MTU before start of the Bluetooth communication.

According to a fourth aspect of embodiments of the disclosure, provided is a device for data transmission, applied to a second electronic device and including: a second receiving portion, configured to: during Bluetooth communication, receive a sounding data packet for the Bluetooth communication, wherein the sounding data packet is sent by a first electronic device according to a candidate value of a maximum transmission unit (MTU); and a second sending portion, configured to send a feedback data packet to the first electronic device according to a data size of the sounding data packet, wherein the feedback data packet is used for the first electronic device to determine an applied value of the MTU.

In some embodiments, the second sending portion includes: a second determination sub-portion, configured to determine whether the data size of the sounding data packet is equal to a predetermined MTU of the second electronic device; and a first sending sub-portion, configured to: in response to that the data size of the sounding data packet is equal to the predetermined MTU, send, to the first electronic device, the feedback data packet at a data size which is equal to that of the sounding data packet, wherein the feedback data packet is used for the first electronic device to determine the candidate value of the MTU as the applied value of the MTU for the Bluetooth communication between the first electronic device and the second electronic device.

In some embodiments, the second sending portion further includes: a second sending sub-portion, configured to: in response to that the data size of the sounding data packet is different from the predetermined MTU, send, to the first electronic device, the feedback data packet at a data size which is smaller than or equal to that of the sounding data packet.

According to a fifth aspect of embodiments of the disclosure, provided is a device for data transmission, including: a processor and a memory for storing executable instructions that can run on the processor, wherein: the processor is configured to run the executable instructions to execute the steps in any above method for data transmission.

According to a sixth aspect of embodiments of the disclosure, provided is a non-transitory computer-readable storage medium having computer-executable instructions stored thereon, wherein the computer-executable instructions, when executed by a processor, implement the steps in any above method for data transmission.

It should be understood that the above general description and the following detailed description are merely exemplary and explanatory, and in no way serve to limit the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
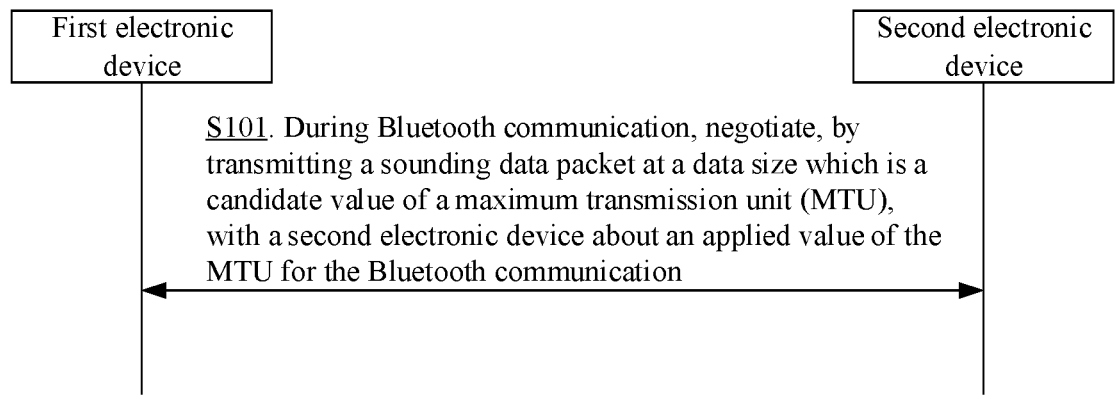
FIG. 1 illustrates a first flowchart of a method for data transmission according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Two devices involved in Bluetooth communication can notify each other of the maximum data size of a data packet unit that can be received by themselves, so that both parties can transmit a data packet of a valid load. The maximum data size of the data packet unit is a maximum transmission unit (MTU).

However, during actual communications, an MTU value may not be used as reference due to a protocol compatibility problem between different data communication layers, actual performance changes of a device, or the like. As a result, phenomenons such as packet loss and communication interruption may occur during communication, affecting communication efficiency and decreasing user experience.

FIG. 1 illustrates a flowchart a method for data transmission according to some embodiments of the present disclosure. The method is applied to a first electronic device, and as illustrated in FIG. 1, include the following steps.

Block S101: during Bluetooth communication, negotiation is made, by transmitting a sounding data packet at a data size which is a candidate value of a maximum transmission unit (MTU), with a second electronic device about an applied value of the MTU for the Bluetooth communication.

Herein, the first electronic device and the second electronic device are both electronic devices with a Bluetooth communication function. The first electronic device may be a mobile or fixed terminal, such as a mobile phone, a notebook, a tablet, a desktop, a smart household appliance, and a wearable electronic device. The second electronic device may also be a mobile or fixed terminal as mentioned above. Besides, the second electronic device may also be an accessory device of the first electronic device, such as a remote control, a mouse, a keyboard or a speaker. In short, the first electronic device and the second electronic device can establish a communication connection and perform data transmission with each other via Bluetooth.

In embodiments of the disclosure, the negotiation of the applied value of the MTU may be realized by sending a sounding data packet at any time during the Bluetooth communication between the first electronic device and the second electronic device.

In embodiments of the disclosure, the candidate value of the MTU is predetermined before the MTU negotiation. The candidate value of the MTU may be determined according to an applied value of the MTU during historical communication between the first electronic device and the second electronic device. The candidate value of the MTU may also be determined according to the MTU of the first electronic device itself, or a preset parameter may be used as the candidate value of the MTU.

In addition, the first electronic device and the second electronic device may directly inform each other of their own MTUs, and uses a smaller one of the two MTUs as the candidate value of the MTU. For example, the first electronic device may send its own MTU value to the second electronic device, and then the second electronic device feeds back its own MTU value to the first electronic device. Both the first electronic device and the second electronic device use the smaller one of the two MTU values as the candidate value of the MTU. Subsequently, an applied value of the MTU that can be actually used is further detected based on the candidate value of the MTU.

The first electronic device may send a sounding data packet to the second electronic device according to the candidate value of the MTU. The data size of the sounding data packet is determined by the candidate value of the MTU. That is, the data size of the sounding data packet is a size corresponding to an MTU specified by the candidate value of the MTU.

In some embodiments, the sounding data packet may carry data corresponding to the candidate value of the MTU. For example, if the data size of the sounding data packet is 50 Bytes, the data content of a specified byte or all bytes of the sounding data packet is the parameter 50. In this way, upon receiving the sounding data packet, the second electronic device can easily check whether the data size of the received sounding data packet is correct according to the data content, and further determine whether the complete sounding data packet is successfully received.

It is to be understood that if the first electronic device sends the sounding data packet to the second electronic device and receives a feedback from the second electronic device successfully, it means that the sounding data packet can be successfully sent to the second electronic device with the current candidate value of the MTU as the size of the sounding data packet. Of course, if no feedback is received from the second electronic device, or the sounding data packet is not successfully transmitted, it means that the current candidate value of the MTU may not meet the communication requirements of both parties. Therefore, the candidate value of the MTU may be adjusted to perform sounding again.

It can be seen that by transmitting the data packet at the data size which is the candidate value of the MTU, sounding of the MTU between the first electronic device and the second electronic device can be realized, thereby determining an MTU supported by both parties as an applied value for subsequent communication. Thus, the stability of the Bluetooth communication can be improved, and incidents such as packet loss and communication interruption may be reduced.

Figure 2:
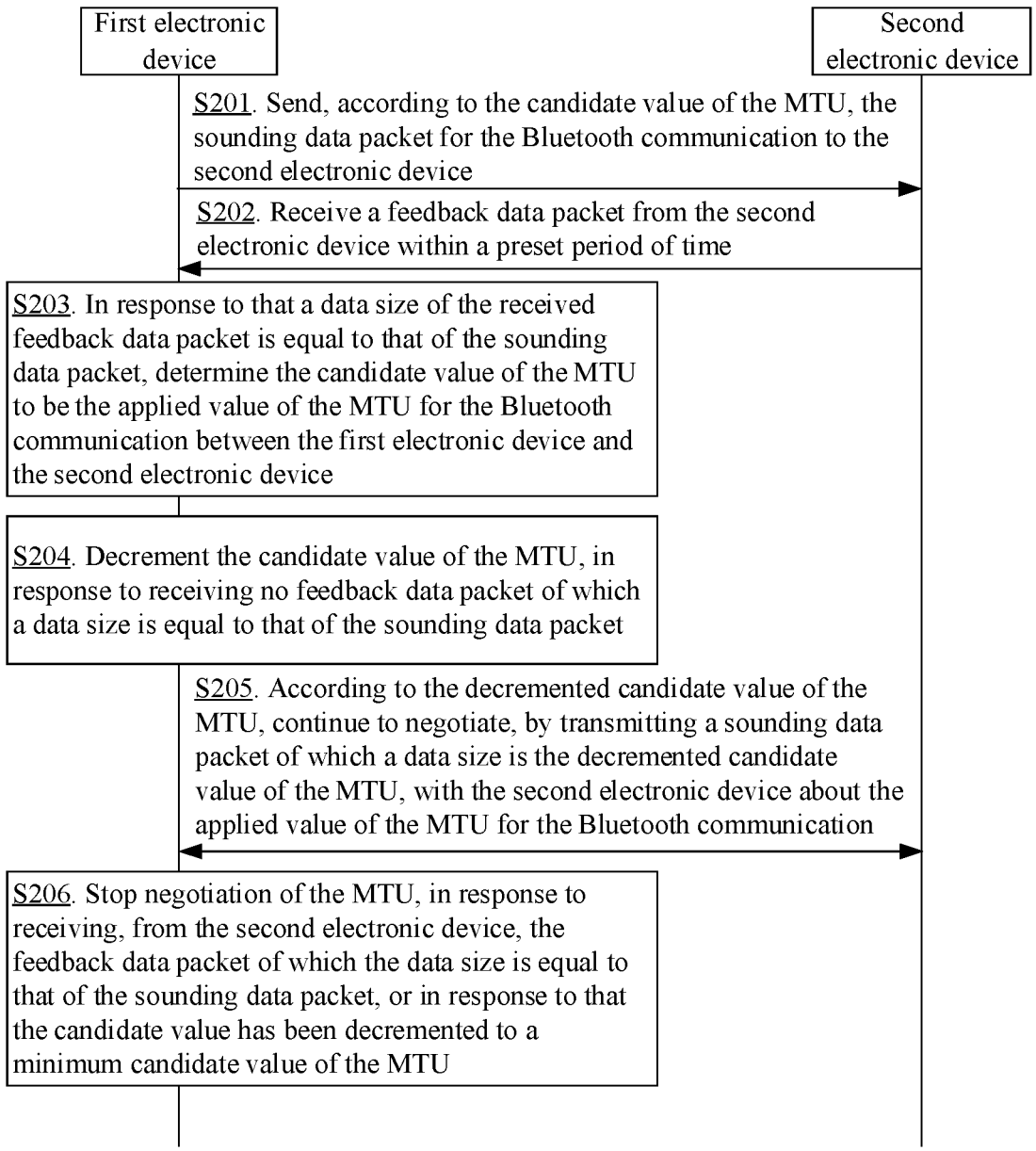
FIG. 2 illustrates a second flowchart of a method for data transmission according to some embodiments of the present disclosure.

In some embodiments, as illustrated in FIG. 2, in the above block S101, the operation that negotiation is made, by transmitting the sounding data packet at the data size which is the candidate value of the MTU, with the second electronic device about the applied value of the MTU for the Bluetooth communication includes the following steps.

Block S201: the sounding data packet for the Bluetooth communication is sent to the second electronic device according to the candidate value of the MTU.

Block S202: a feedback data packet is received from the second electronic device within a preset period of time.

Block S203: in response to that a data size of the received feedback data packet is equal to that of the sounding data packet, the candidate value of the MTU is determined to be the applied value of the MTU for the Bluetooth communication between the first electronic device and the second electronic device.

In embodiments of the disclosure, the first electronic device may send, according to the candidate value of the MTU, the sounding data packet at the data size which is the candidate value of the MTU to the second electronic device, for sounding. Within a predetermined period of time, the first electronic device waits for a response from the second electronic device, and receives a feedback data packet from the second electronic device.

In some embodiments, the predetermined period of time may be determined according to a bandwidth or a transmission rate supported by the communication between the first electronic device and the second electronic device.

In some embodiments, the predetermined period of time may be a preset fixed period of time. If the first electronic device and the second electronic device can communicate normally and receive data from each other, the first electronic device can receive the response from the second electronic device within the predetermined period of time. If the sounding data packet sent by the first electronic device does not arrive at the second electronic device successfully, or the feedback data packet sent from the second electronic device cannot be received by the first electronic device, then the first electronic device can receive no feedback data packet within the predetermined period of time.

Therefore, according to whether a feedback data packet is successfully received from the second electronic device within the predetermined time period, the first electronic device may determine whether the communication between the two parties is normal, and further determine whether the sounding data packet can be successfully sent to the second electronic device.

In embodiments of the disclosure, the negotiation of the MTU between the two parties is also realized through the received feedback data packet. Since the sounding data packet received by the second electronic device may not match the MTU of the second electronic device, instability may occur subsequently even if the sounding data packet is successfully received. Moreover, the second electronic device may send a feedback data packet to the first electronic device based on the MTU of the second network device. In this way, the data size of the feedback data packet received by the first electronic device is different from the data size of the sounding data packet. Therefore, the first electronic device cannot consider that the current candidate value of the MTU is a reliable MTU value, and therefore the current candidate value cannot serve as the applied value of the MTU for subsequent Bluetooth communication.

Correspondingly, if the first electronic device receives the feedback data packet from the second electronic device, and the data size of the feedback data packet is equal to that of the sounding data packet, it means that the current candidate value of the MTU can be accepted by both the first electronic device and the second electronic device, and normal communication can be realized. Therefore, when the first electronic device receives a feedback data packet at the data size which is equal to that of the sounding data packet, the current candidate value of the MTU is determined to be the applied value of the MTU for the subsequent Bluetooth communications between the two parties. In the subsequent communication, data transmission is performed by the standard of the determined applied value of the MTU.

In this way, the negotiation of the MTU for Bluetooth communication between the first electronic device and the second electronic device is realized, and data transmission is performed with the applied value being an MTU which is verified by both parties as being able to ensure normal data transceiving. Thus, the reliability of the MTU during subsequent communication is improved, and phenomenons such as packet loss, delay or communication interruption may be reduced.

In some embodiments, the operation that negotiation is made, by transmitting the sounding data packet at the data size which is the candidate value of the MTU, with the second electronic device about the applied value of the MTU for the Bluetooth communication further includes the following steps.

Block S204: the candidate value of the MTU is decremented in response to receiving no feedback data packet at a data size which is equal to that of the sounding data packet.

Block S205: according to the decremented candidate value of the MTU, it is continued to negotiate, by transmitting a sounding data packet at a data size which is the decremented candidate value of the MTU, with the second electronic device about the applied value of the MTU for the Bluetooth communication.

Block S206: negotiation of the MTU is stopped in response to receiving, from the second electronic device, a feedback data packet at a data size which is equal to that of the sounding data packet, or in response to that the candidate value has been decremented to a minimum candidate value of the MTU.

If the first electronic device receives no feedback data packet after sending the sounding data packet, or a data size of a feedback data packet received by the first electronic device is different from that of the sounding data packet, it means that the MTU sounding has failed, and no consistent MTU has been obtained by the first electronic device and the second electronic device through the negotiation. At this time, if data transmission is continued with the current candidate value of the MTU, a transmitted data packet may exceed the receiving capacity of the other party due to the unreliable MTU, resulting in phenomenons such as packet loss.

Therefore, in the above situation, the first electronic device may decrement the candidate value of the MTU, and send a modified sounding data packet again to negotiate with the second electronic device. In this way, the sounding data packet is repeatedly sent for negotiation of the MTU, until a consistent candidate value of the MTU is obtained through negotiation with the second electronic device, to serve as the final applied value of the MTU. Otherwise, negotiation is continued until the candidate value of the MTU has been decremented to a minimum candidate value of the MTU and cannot be further decremented.

In embodiments of the disclosure, a default maximum MTU of the first electronic device may be used as an initial candidate value of the MTU, or a smaller one of default MTUs of the first electronic device and the second electronic device may be used as the initial candidate value of the MTU. That is to say, the initial candidate value of the MTU may be a maximum value of the MTU supported by both parties. In subsequent sounding, the above-mentioned adjustment of decrement is made continuously until both electronic devices can successfully perform data interaction with a current MTU during communication.

In this way, the two parties interact with each other to continuously detect an appropriate MTU, so as to finally obtain a maximum applied value of the MTU that can meet the requirements of both parties. Moreover, waste of communication resources can be reduced as far as possible.

In some embodiments, in the above block S204, the operation that the candidate value of the MTU is decremented in response to receiving no feedback data packet at a data size which is equal to that of the sounding data packet includes one of the following. In response to receiving, from the second electronic device within the preset period of time, a feedback data packet at a data size which is different from that of the sounding data packet, the candidate value of the MTU is decremented according to the data size of the feedback data packet. In response to receiving, from the second electronic device within the preset period of time, a feedback data packet at a data size which is different from that of the sounding data packet, the candidate value of the MTU is decremented according to a first predetermined adjustment value.

In embodiments of the disclosure, there may be two situations where the first electronic device receives no feedback data packet at a data size which is equal to that of the sounding data packet.

In a first situation, the first electronic device receives the feedback data packet from the second electronic device, but the data size of the feedback data packet is different from that of the sounding data packet. That is, the first electronic device and the second electronic device failed to obtain a consistent MTU through the negotiation. At this time, the first electronic device may decrement the candidate value of the MTU according to the first predetermined adjustment value, and performs sounding again. The first predetermined value may be determined according to actual needs, or may be preset by a user or a device manufacturer. For example, when adjusting the candidate value of the MTU, the candidate value may be decremented by a fixed numeric value each time, such as a data size of 10 units, or the candidate value may be decremented by 5 percent of the current candidate value of the MTU. If it is required to determine an applied value of the MTU that is as large as possible, the candidate value of the MTU may be fine-tuned each time for sounding, so that subsequent data transmission maintains a data transmission speed as high as possible. If it is required to determine a stable applied value of the MTU as quickly as possible, then the candidate value may be reduced by a larger first predetermined adjustment value each time, so as to quickly obtain the applied value of the MTU that can be supported by both parties.

Since the data size of the sounding data packet may be greater than the actual transmission capacity of the second electronic device, the second electronic device may only receive a part of the sounding data packet. At this time, the feedback data packet received by the first electronic device is smaller than the sounding data packet. Since the data size of the feedback data packet may be determined by the second electronic device according to the MTU of the second electronic device, the amplitude of the candidate value of the MTU may also be adjusted according to the data size of the received feedback data packet, so as to perform sounding again. That is, the first electronic device may use the data size of the feedback data packet as the adjusted candidate value of the MTU, and use same as the data size of the sounding data packet to be sent next time. In this way, the candidate value of the MTU that can meet requirements of both parties can be quickly determined as an applied value, thereby reducing the number of soundings and improving interaction efficiency.

It is to be understood that, if the second electronic device can successfully receive the complete sounding data packet, it indicates that the MTU of the second electronic device its own is greater than or equal to the data size of the sounding data packet. The second electronic device may directly feed back a feedback data packet with the same data size as the sounding data packet, to determine the sounding result. Therefore, when the first electronic device receives the feedback data packet with the same data size as the sounding data packet, it may be determined that the two parties can communicate with each other with the current candidate value of the MTU, and the negotiation succeeds.

In addition, there may be a second situation: if the first electronic device receives no feedback data packet within a predetermined period of time, the candidate value of the MTU can also be decremented according to the first predetermined adjustment value, to perform negotiation again.

In some embodiments, in the above block S204, the operation that the candidate value of the MTU is decremented in response to receiving no feedback data packet at a data size which is equal to that of the sounding data packet includes: in response to receiving no feedback data packet from the second electronic device within the preset period of time, the candidate value of the MTU is decremented according to a second predetermined adjustment value.

Herein, the first electronic device receives no feedback data packet from the second electronic device after waiting for a predetermined period of time. The event that first electronic device receives no response from the second electronic device within the predetermined time period means that the sounding data packet sent by the first electronic device to the second electronic device was not successfully received by the second electronic device, or the data size of the feedback data packet sent by the second electronic device is too large to be received by the first electronic device. Therefore, the first electronic device and the second electronic device failed to obtain a unified MTU through the negotiation.

Therefore, after a predetermined period of time, the first electronic device may still decrement the candidate value of the MTU according to the above-mentioned second predetermined adjustment value, and then send a corresponding sounding data packet again to perform a new round of negotiation. Herein, the second predetermined adjustment value is similar to the first predetermined adjustment value, and may be determined according to actual needs or preset by a user or a device manufacturer. The second predetermined adjustment value may or may not be equal to the first predetermined adjustment value. In this way, the applied value of the MTU is successfully negotiated, after multiple soundings are performed until receiving, from the second electronic device, the feedback data packet at the data size which is equal to that of the sounding data packet. In the subsequent Bluetooth communication, data communication may be performed according to the applied value of the MTU.

In some embodiments, the second predetermined adjustment value may be greater than the first predetermined adjustment value. The first predetermined adjustment value is used in the situation that the first electronic device has received the feedback data packet, and it indicates that data interaction between the first electronic device and the second electronic device can still be realized although no consistent MTU applied value has been obtained through negotiation. Therefore, the current MTU candidate value may already be close to the MTU at which data interaction can be performed between the first electronic device and the second electronic device normally. In this way, an agreement can be reached quickly by slightly decrementing the candidate value of the MTU. The second predetermined adjustment value is used in the situation that the first electronic device receives no feedback data packet, and it indicates that data interaction cannot be realized between the first electronic device and the second electronic device through the current MTU candidate value. Thus, the MTU candidate value can be decremented by a large extent, to reach an agreement quickly.

In some embodiments, the operation that negotiation is made, by transmitting the sounding data packet at the data size which is the candidate value of the MTU, with the second electronic device about the applied value of the MTU of the Bluetooth communication further includes: in response receiving, from the second electronic device, no feedback data packet at a data size which is equal to that of the sounding data packet, a minimum candidate value is determined to be the applied value of the MTU.

In practical application, the data transmission rate may not be very high. Therefore, in order to quickly obtain the applied value of the MTU during the negotiation, the candidate value of the MTU may be directly adjusted to a minimum candidate value if no feedback data packet is obtained. For example, the minimum candidate value of the MTU is the default minimum data size of most Bluetooth devices, such as 20 Bytes. In this way, the negotiation may succeed in one round, so as to continue subsequent data transmission, reducing unnecessary sounding.

In some embodiments, in the above block S101, the operation that during the Bluetooth communication, negotiation is made, by transmitting the sounding data packet at the data size which is the candidate value of the MTU, with the second electronic device about the applied value of the MTU of the Bluetooth communication includes: after data transmission is initiated in the Bluetooth communication, negotiation is made with the second electronic device about the applied value of the MTU of the Bluetooth communication, by transmitting, at a predetermined interval or at a moment when the data transmission is suspended, the sounding data packet at the data size which is the candidate value of the MTU.

In embodiments of the disclosure, the above-mentioned MTU negotiation may occur at any moment after initiating data transmission in the Bluetooth communication, including: during data transmission. For example, if the MTU negotiation occurs during data transmission, a sounding data packet may be inserted into a transmitted data stream, and the applied value of the MTU in the current communication process may be adjusted in real time according to the feedback data packet received from the second electronic device, so as to optimize the performance of data communication. For another example, during data transmission, if an abnormal signal corresponding to packet loss, delay, interruption or the like is detected, the first electronic device may send a sounding data packet to the second electronic device, and adjust the applied value of the MTU according to the feedback data packet received from the second electronic device, so as to optimize the performance of data communication. Thus, abnormal situations such as packet loss, delay or interruption in the subsequent communication process may be reduced.

In embodiments of the disclosure, the above-mentioned 'any moment after initiating data transmission in the Bluetooth transmission' further includes: a period of time during which data transmission is suspended. Examples are given below: a period of time during which data transmission is initiated in the Bluetooth communication, a Bluetooth connection has been established but data transmission has not started yet, or a period of time after completing data transmission of one file and before data transmission of a next file. Another example is: a period during which data transmission is suspended in a processing procedure such as data encoding/decoding after data transmission. In this way, the time period for data transmission may not be occupied, and the impact of the sounding process on data transmission may be reduced.

Through the MTU negotiation during Bluetooth communication, real-time adjustment of the MTU can be realized, and less data transmission time can be occupied. At the same time, the probability of occurrence of the following is reduced: a current MTU is unreliable due to factors such as unstable performance of an electronic device or signal interference in a communication channel, resulting in stability of data transmission being reduced.

In some embodiments, the method further includes: negotiation is made with the second electronic device about the candidate value of the MTU before start of the Bluetooth communication.

In embodiments of the disclosure, the first electronic device and the second electronic device may negotiate about the candidate value of MTU in advance before performing Bluetooth communication, to use the candidate value as the initial value for further MTU negotiation in the above embodiment.

Here, the candidate value of the MTU may be negotiated in such a way that the first electronic device may directly send its own MTU value to the second electronic device. The MTU value may be a parameter indicating the communication capability of the first electronic device. The MTU value may be sent through only a minimum data size of communication that can bear the parameter value, or through a default common data size of communication. For example, data communication is to be performed with a data packet size of 20 Bytes by default in the current Bluetooth communication, while the current MTU of the first electronic device is 80 Bytes. Then the first electronic device may carry a number 80 as the data content in a 20-Bytes data packet to send to the second electronic device, or may carry the number 80 as the data content in a smaller data packet to send to the second electronic device, so that the parameter can be successfully sent to the second electronic device.

The second electronic device may feed back its own MTU to the first electronic device. For example, the MTU of the second electronic device is 60 Bytes, and the second electronic device carries a number 60 as the data content in a 20-Bytes or smaller data packet, and sends the data packet to the first electronic device.

After receiving the feedback from the second electronic device an learning that the MTU of the second electronic device is smaller than that of the first electronic device, the first electronic device may use the MTU of the second electronic device as a candidate value of the MTU which is further used as an initial value for subsequent MTU negotiation.

It can be seen that in this embodiment, the process of negotiating the candidate value of the MTU between the first electronic device and the second electronic device differs from the process of negotiating the applied value of the MTU in the above embodiment in that: here, the first electronic device and the second electronic device directly inform each other of the default MTUs of themselves. The default MTUs of the two parties themselves have not been verified by actual communication, that is, the two parties in communication have not communicated with each other with the default MTU values as the data size of the data packet. Therefore, the candidate value of the MTU is not necessarily a reliable MTU value.

However, it is to be understood that since the candidate value of the MTU is obtained by the two electronic devices through negotiation, the candidate value of the MTU is close to a reliable MTU value, and may be used as the final applied value of the MTU after the sounding. In this way, using the negotiated candidate value of the MTU as the initial value for further MTU negotiation subsequently, the number of times that sounding data packets and feedback data packets are transmitted during the negotiation can be reduced, improving the efficiency of negotiation.

Figure 3:
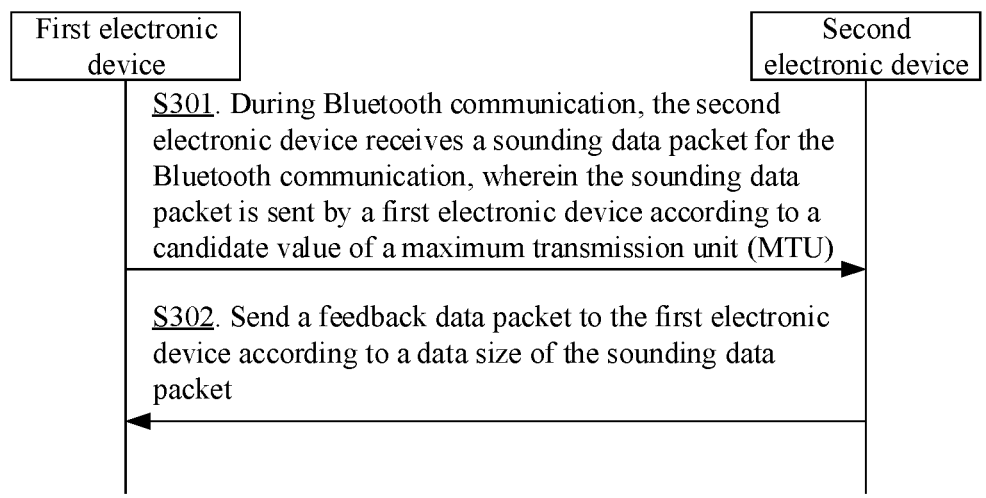
FIG. 3 illustrates a third flowchart of a method for data transmission according to some embodiments of the present disclosure.

As illustrated in FIG. 3, in embodiments of the disclosure, also provided is a method for data transmission applied to a second electronic device. The method includes the following steps.

Block S301: during Bluetooth communication, the second electronic device receives a sounding data packet for the Bluetooth communication. The sounding data packet is sent by a first electronic device according to a candidate value of a maximum transmission unit (MTU).

Block S302: a feedback data packet is sent to the first electronic device according to a data size of the sounding data packet. The feedback data packet is used for the first electronic device to determine an applied value of the MTU.

In embodiments of the disclosure, the above-mentioned first electronic device may serve as the party that initiates MTU negotiation, that is, actively sending a sounding data packet. The second electronic device may serve as the party that accepts the MTU negotiation, and start to negotiate with the first electronic device when receiving the sounding data packet.

It is to be noted that, in actual application, the types of the first electronic device and the second electronic device are not limited. That is to say, during the Bluetooth communication between the two electronic devices, either one of the two electronic devices may act as the first electronic device to initiate MTU negotiation, or may be the accepting party. During communication, the role of initiating MTU negotiation may be even exchanged in different time periods or in different scenarios according to requirements.

In embodiments of the disclosure, in response to receiving the sounding data packet from the first electronic device, the second electronic device may determine, according to its own communication capability, whether the data size of the sounding data packet meets its own data communication needs and capabilities, and respond to the first electronic device by sending the feedback data packet so that the first electronic device determines the applied value of the MTU.

Figure 4:
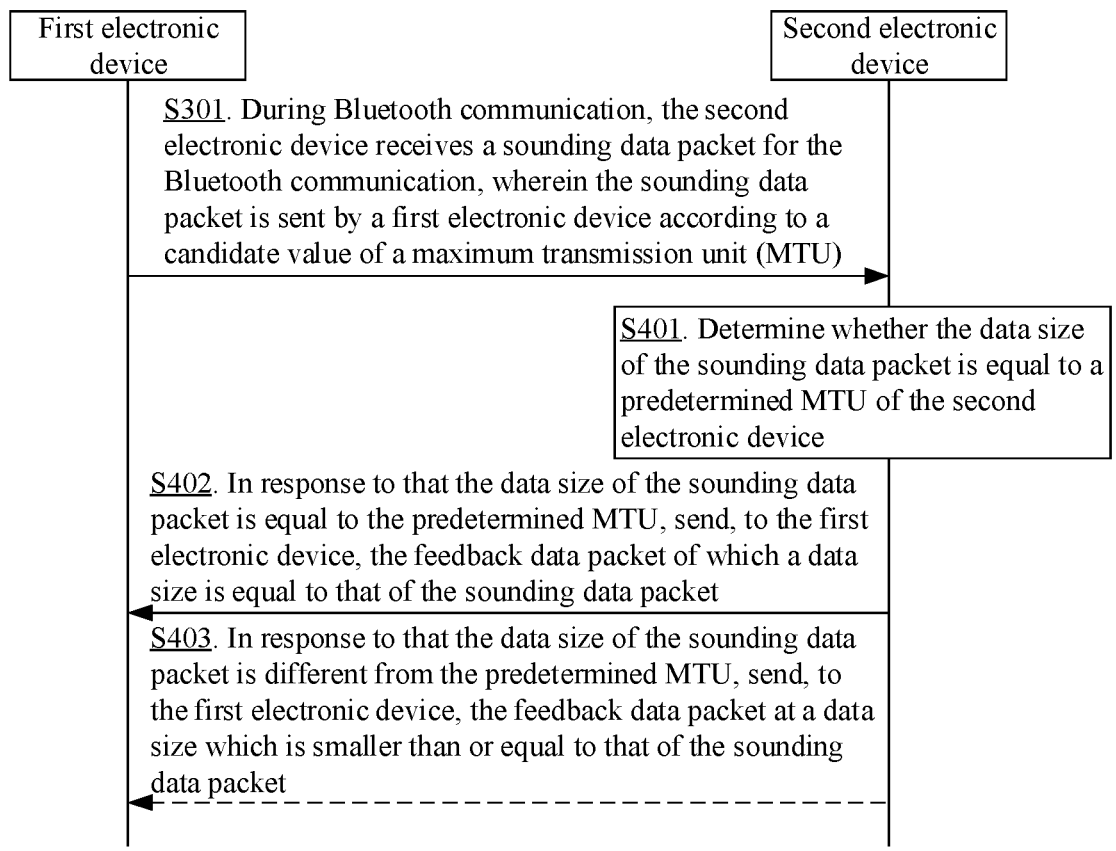
FIG. 4 illustrates a fourth flowchart of a method for data transmission according to some embodiments of the present disclosure.

In some embodiments, as illustrated in FIG. 4, in the above block S302, the operation that the feedback data packet is sent to the first electronic device according to the data size of the sounding data packet includes the following steps.

Block S401: whether the data size of the sounding data packet is equal to a predetermined MTU of the second electronic device is determined.

Block S402: in response to that the data size of the sounding data packet is equal to the predetermined MTU, the feedback data packet at a data size which is equal to that of the sounding data packet is sent to the first electronic device. The feedback data packet is used for the first electronic device to determine the candidate value of the MTU as the applied value of the MTU for the Bluetooth communication between the first electronic device and the second electronic device.

The second electronic device may compare the data size of the sounding data packet with its own predetermined MTU. If different, it may not be able to achieve stable data transmission with the current MTU subsequently, and the negotiation fails. If the data size of the current sounding data packet is equal to the predetermined MTU, the second electronic device can perform data communication according to the current candidate value of the MTU. Therefore, in this case, a feedback data packet with equal data size as the sounding data packet may be sent to the first electronic device to achieve interaction between the two parties, thereby verifying that the current candidate value of the MTU is usable, so that the first electronic device determines the candidate value of the MTU to be the applied value of the MTU.

In some embodiments, in block S302, the operation that the feedback data packet is sent to the first electronic device according to the data size of the sounding data packet further includes the following step.

Block S403: in response to that the data size of the sounding data packet is different from the predetermined MTU, the feedback data packet at a data size which is smaller than or equal to that of the sounding data packet is sent to the first electronic device.

In the case where the sounding data packet received by the second electronic device is larger than a predetermined MTU of the second electronic device, packet loss may be caused due to restriction of the communication capability of the second electronic device itself if the current candidate value of the MTU is used in subsequent communication. In this case, the current candidate value of the MTU may be decremented by a certain data size to serve as a data size of a feedback data packet, so that the data size of the feedback data packet meets the communication capability of the second electronic device itself. Thus, the first electronic device is informed that the candidate value of the MTU needs to be adjusted according to the data size of the feedback data packet.

If the sounding data packet received by the second electronic device is smaller than the predetermined MTU of the second electronic device, the predetermined MTU of the second electronic device cannot be used as the applied value of the MTU, but the current candidate value of the MTU meets capability requirements of the second electronic device. Therefore, the second electronic device may send a feedback data packet to the first electronic device according to the data size of the sounding data packet. Thus, the MTU agreed with the first electronic device is determined to be the data size of the sounding data packet.

In this way, the feedback to the MTU negotiation, which negotiation is initiated by the first electronic device, is realized, facilitating determining a consistently applied value of the MTU between the two electronic devices.

The following example is also provided in embodiments of the disclosure.

During data transmission of a large file performed by a Bluetooth Low Energy (BLE) device, such as voice data transmission, Bluetooth Over the Air (OTA) upgrade, or other scenarios, Bluetooth data transmission needs to be as efficient as possible, so as to reduce time consumption and thus improve user experience.

Due to the compatibility issues of a Bluetooth protocol stack between electronic devices, in actual use, when two parties of interaction perform packaging and communication with an MTU value obtained through protocol stack interaction, incidents such as packet loss, incomplete data packets, or data packets always having a small length such as a default value of 20 Bytes often occur. In this way, during Bluetooth communication of the two electronic devices, the data transmission has poor quality and a low rate, and may be easily disconnected.

Therefore, in embodiments of the disclosure, the two electronic devices in Bluetooth data transmission exchange MTU values of themselves before performing data transmission, and take a smaller one of the MTU values as the candidate value of the MTU. Then, one of the electronic devices generates a sounding data packet with a size equal to the candidate value and sends the sounding data packet to the other party, and determines, according to a response from the other party, whether the candidate value of the MTU satisfies actual communication capabilities of the two electronic devices, so as to determine an applied value of the MTU for subsequent communication.

The following two scenarios are provided as examples.

First, BLE OTA upgrade scenario:

When a system upgrade is needed, a Bluetooth-alone device, that is, an independent Bluetooth device having no network communication function, needs to perform, via a Bluetooth function, data communication with a terminal device having a network communication function, to acquire upgrade relevant data. During OTA upgrade, the two parties firstly perform data transmission with a data packet of a default 20-Bytes size. During the transmission or when the transmission is in an IDLE (suspended) state, the two electronic devices interact with each other to negotiate an MTU, and perform sounding by transmitting a data packet with a data size equal to a minimum of current default MTUs of the two parties. When the sounding is successful, a data packet may be adjusted to have the successfully detected MTU size for transmission, during subsequent data transmission.

Second, scheme for transmitting log of Wireless Fidelity (WiFi) network distribution failure of smart device:

WiFi network distribution needs to be performed for smart devices, such as smart home devices, smart speakers, and smart wearable devices, through devices such as mobile phones, computers or other devices. When the network distribution is successful, the smart device interacts with a mobile phone, a computer or a cloud through WiFi. When the network distribution fails, the smart device needs to transmit a relevant log with the electronic device such as the mobile phone or the computer via a Bluetooth function, so as to analyse such as the reason of network distribution failure. During transmission of the log, data transmission is performed firstly with a data packet of a default 20-Bytes size. During the transmission or when the transmission is in an IDLE state, the two parties interact with each other to negotiate the MTU, and perform sounding by transmitting a data packet with a data size equal to a minimum of current default MTUs of the two parties. When the sounding is successful, a data packet may be adjusted to have the successfully detected MTU size for transmission, during subsequent data transmission.

Figure 5:
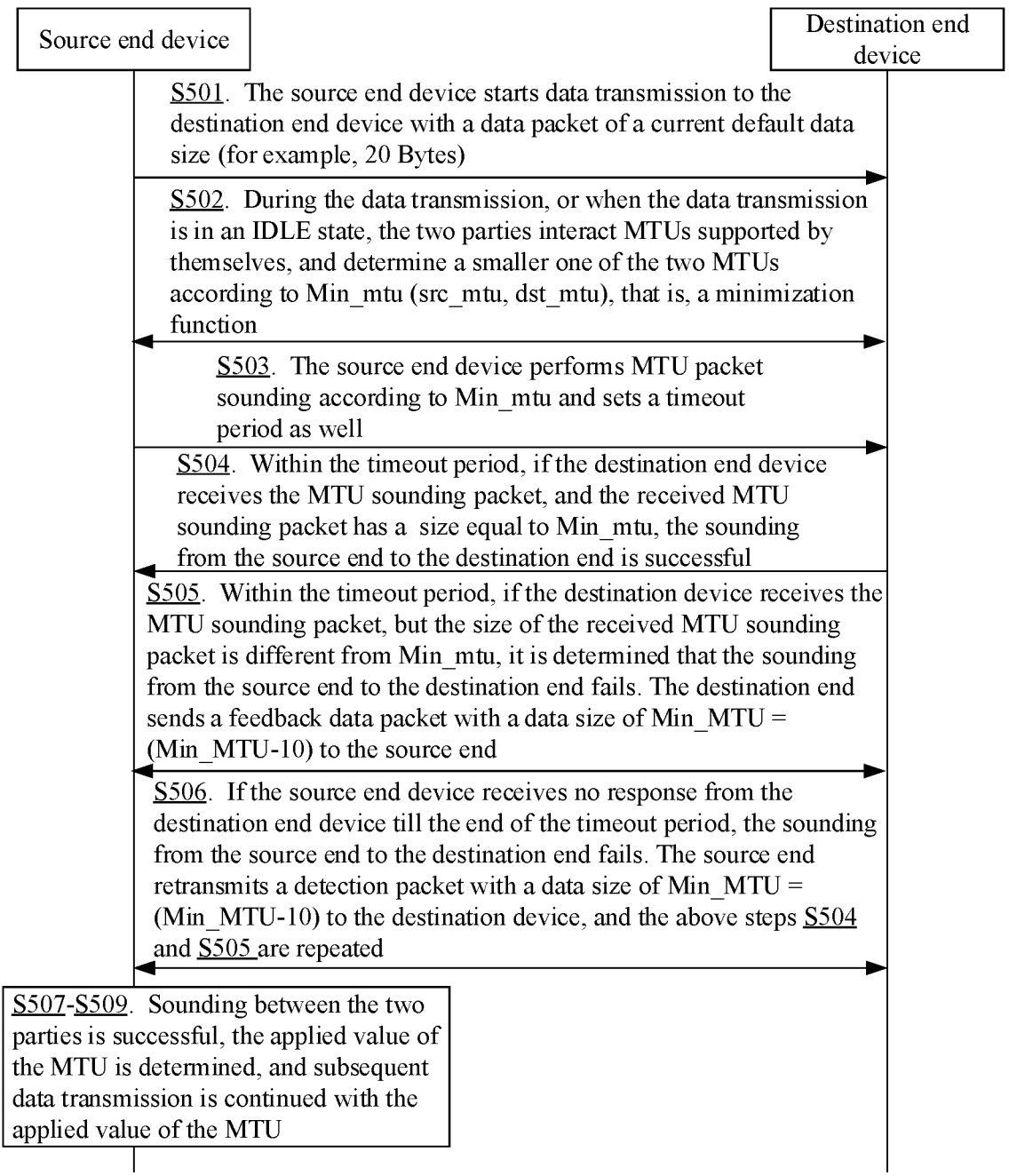
FIG. 5 illustrates a fifth flowchart of a method for data transmission according to some embodiments of the present disclosure.

The above-mentioned MTU negotiation process may be represented by the following steps as illustrated in FIG. 5.

Block S501: a source end device starts data transmission to a destination end device with a data packet of a current default data size (for example, 20 Bytes).

Block S502: during the data transmission, or when the data transmission is in an IDLE state, the two parties interact MTUs supported by themselves, and determine a smaller one of the two MTUs according to Min_mtu (src_mtu, dst_mtu), that is, a minimization function.

Block S503: the source end device performs MTU packet sounding according to Min_mtu and sets a timeout period as well.

Block S504: within the timeout period, if the destination end device receives the MTU sounding packet, and the received MTU sounding packet has a size equal to Min_mtu, the sounding from the source end to the destination end is successful. The destination end saves the MTU value, and then sends an MTU sounding packet to the source end in the same way, which may also be considered as a feedback data packet.

Block S505: within the timeout period, if the destination device receives the MTU sounding packet, but the size of the received MTU sounding packet is different from Min_mtu, it is determined that the sounding from the source end to the destination end fails. The destination end sends a feedback data packet with a data size of Min_MTU=(Min_MTU−10) to the source end.

Block S506: if the source end device receives no response from the destination end device till the end of the timeout period, the sounding from the source end to the destination end fails. The source end retransmits a sounding packet with a data size of Min_MTU=(Min_MTU−10) to the destination device, and the above blocks S504 and S505 are repeated.

Block S507: after the source end device receives the data fed back by the destination device: if the size of the feedback data packet is equal to Min_mtu, it means that the bidirectional sounding is successful, and the MTU value may be updated for data transmission subsequently; and if the size of the feedback data packet is different from Min_mtu, the sounding from the destination end to the source end fails, and the source end sends a data packet with a size of Min_MTU=(Min_MTU−10) to the destination end again, and the above blocks S504 and S505 are repeated.

Block S508: a final reliable MTU value is determined to be the applied value according to a result of the bidirectional sounding.

Block S509: the data packet is updated to be a data packet having a size equal to the applied value of the MTU, to continue subsequent transmission.

The format of the above MTU sounding data packet or feedback data packet may be as illustrated in Table 1 below:

TABLE 1

| 1 | 2 | ...... | 49 | 50 |
|---|---|--------|----|----|
| 50 | ...... | ...... | ...... | MTU value |

In the data packet illustrated in Table 1, the MTU value is 50. Therefore, the parameter 50 may be carried in any one or more bytes. At the same time, the number of bytes in the data packet is 50. In this way, when receiving the data packet, the other party can determine whether the complete data packet is successfully received according to the size of the data packet and the MTU value parameter carried in the data packet.

Through the above method, the problem that an MTU result negotiated through a BLE protocol stack is unreliable is solved, and the stability and completeness of the packet data are guaranteed. At the same time, a reliable maximum MTU value can be dynamically negotiated during the data transmission, and the data packet can be as large as possible to ensure the fastest speed of data transmission. In this way, a reliable and fast transmission scheme is provided for BLE data transmission. For devices that use BLE to transmit large data files, this solution can significantly improve the stability and speed in data transmission.

Figure 6:
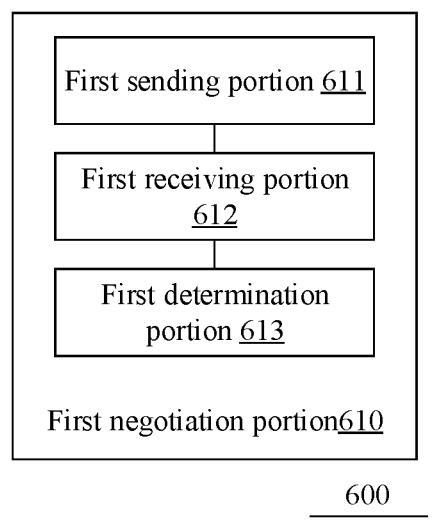
FIG. 6 illustrates a first structural block diagram of a device for data transmission according to some embodiments of the present disclosure.

FIG. 6 illustrates a structural block diagram of a device for data transmission according to some embodiments of the present disclosure. As illustrated in FIG. 6, the device 600 is applied to a first electronic device, and includes a first negotiation portion 610.

The first negotiation portion 610 is configured to: during Bluetooth communication, negotiate, by transmitting a sounding data packet at a data size which is a candidate value of a maximum transmission unit (MTU), with a second electronic device about an applied value of the MTU for the Bluetooth communication.

In some embodiments, the first negotiation portion includes: a first sending portion 611, a first receiving portion 612, and a first determination portion 613.

The first sending portion 611 is configured to send, according to the candidate value of the MTU, the sounding data packet for the Bluetooth communication to the second electronic device.

The first receiving portion 612 is configured to receive a feedback data packet from the second electronic device within a preset period of time.

The first determination portion 613 is configured to: in response to that a data size of the received feedback data packet is equal to that of the sounding data packet, determine the candidate value of the MTU to be the applied value of the MTU for the Bluetooth communication between the first electronic device and the second electronic device.

In some embodiments, the first negotiation portion further includes: a first adjustment portion, a negotiation sub-portion and a stop sub-portion.

The first adjustment portion is configured to: decrement the candidate value of the MTU in response to receiving no feedback data packet at a data size which is equal to that of the sounding data packet.

The negotiation sub-portion, configured to: according to the decremented candidate value of the MTU, continue to negotiate, by transmitting a sounding data packet at a data size which is the decremented candidate value of the MTU, with the second electronic device about the applied value of the MTU for the Bluetooth communication.

The stop sub-portion is configured to stop negotiation of the MTU, in response to receiving, from the second electronic device, the feedback data packet at the data size which is equal to that of the sounding data packet, or in response to that the candidate value has been decremented to a minimum candidate value of the MTU.

In some embodiments, the adjustment portion includes: a first adjustment sub-portion or a second adjustment sub-portion.

The first adjustment sub-portion is configured to: in response to receiving, from the second electronic device within the preset period of time, a feedback data packet at a data size which is different from that of the sounding data packet, decrement the candidate value of the MTU according to the data size of the feedback data packet.

The second adjustment sub-portion is configured to: in response to receiving, from the second electronic device within the preset period of time, a feedback data packet at a data size which is different from that of the sounding data packet, decrement the candidate value of the MTU according to a first predetermined adjustment value.

In some embodiments, the adjustment portion includes a third adjustment sub-portion.

The third adjustment sub-portion is configured to: in response to receiving no feedback data packet from the second electronic device within the preset period of time, decrement the candidate value of the MTU according to a second predetermined adjustment value.

In some embodiments, the first negotiation portion further includes a first determination sub-portion. The first determination sub-portion is configured to: in response receiving no feedback data packet at a data size which is equal to that of the sounding data packet, determine a minimum candidate value to be the applied value of the MTU.

In some embodiments, the first negotiation portion is configured to: after data transmission is initiated in the Bluetooth communication, negotiate with the second electronic device about the applied value of the MTU for the Bluetooth communication, by transmitting, at a predetermined interval or at a moment when the data transmission is suspended, the sounding data packet at the data size which is the candidate value of the MTU.

In some embodiments, the device further includes a second negotiation portion. The second negotiation portion is configured to negotiate with the second electronic device about the candidate value of the MTU before start of the Bluetooth communication.

Figure 7:
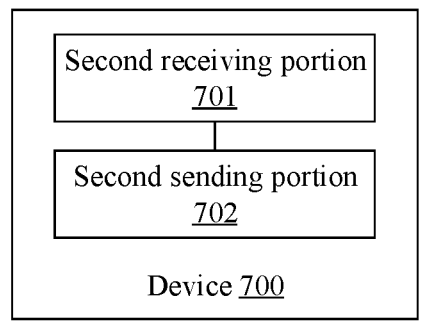
FIG. 7 illustrates a second structural block diagram of a device for data transmission according to some embodiments of the present disclosure.

FIG. 7 illustrates a structural block diagram of a device for data transmission according to some embodiments of the present disclosure. As illustrated in FIG. 7, the device 700 is applied to a second electronic device, and includes a second receiving portion 701 and a second sending portion 702.

The second receiving portion 701 is configured to: during Bluetooth communication, receive a sounding data packet for the Bluetooth communication. The sounding data packet is sent by a first electronic device according to a candidate value of a maximum transmission unit (MTU).

The second sending portion 702 is configured to send a feedback data packet to the first electronic device according to a data size of the sounding data packet. The feedback data packet is used for the first electronic device to determine an applied value of the MTU.

In some embodiments, the second sending portion includes a second determination sub-portion and a first sending sub-portion.

The second determination sub-portion is configured to determine whether the data size of the sounding data packet is equal to a predetermined MTU of the second electronic device.

The first sending sub-portion is configured to: in response to that the data size of the sounding data packet is equal to the predetermined MTU, send, to the first electronic device, the feedback data packet at a data size which is equal to that of the sounding data packet. The feedback data packet is used for the first electronic device to determine the candidate value of the MTU as the applied value of the MTU for the Bluetooth communication between the first electronic device and the second electronic device.

In some embodiments, the second sending portion further includes a second sending sub-portion. The second sending sub-portion is configured to: in response to that the data size of the sounding data packet is different from the predetermined MTU, send, to the first electronic device, the feedback data packet at a data size which is smaller than or equal to that of the sounding data packet.

With respect to the device in the above embodiment, the specific manner in which each portion performs the operation has been described in detail in the method embodiment, and a detailed description will not be given here.

Figure 8:
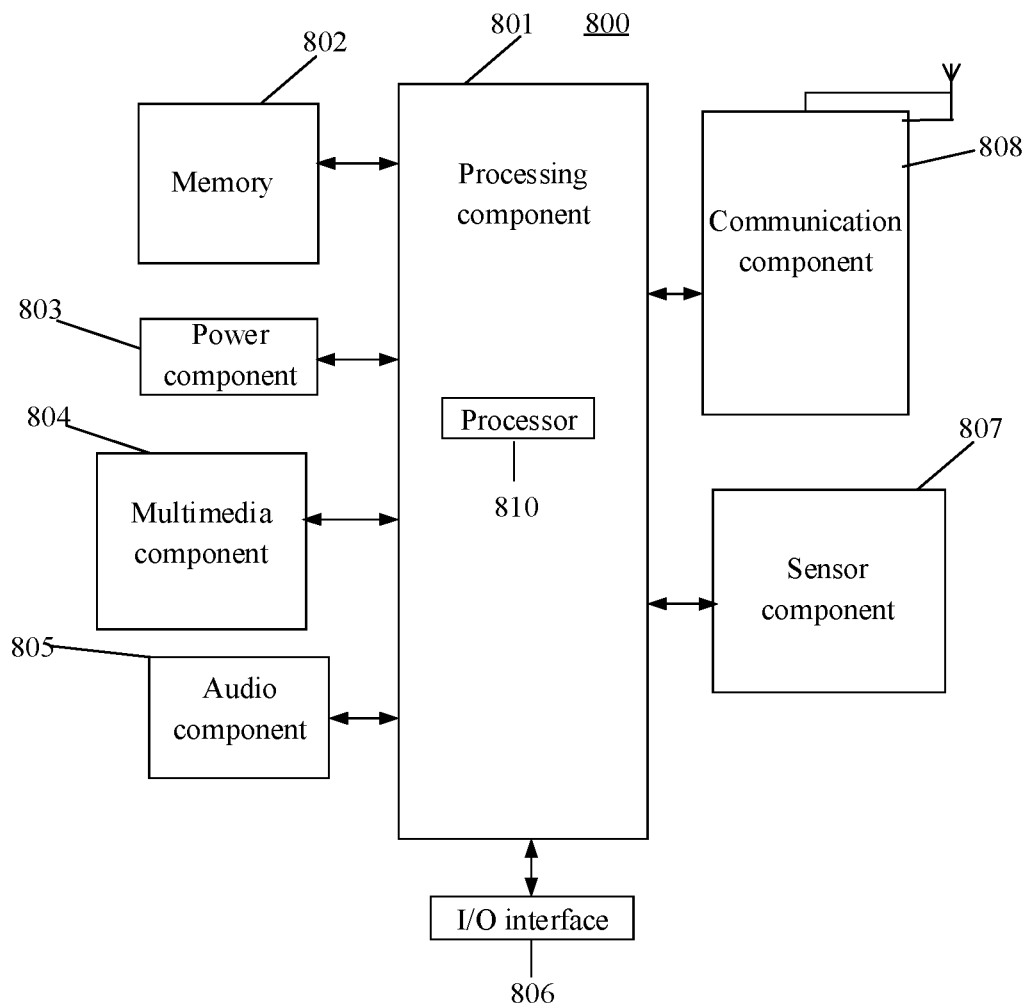
FIG. 8 illustrates a physical structural block diagram of a device for data transmission according to some embodiments of the present disclosure.

FIG. 8 illustrates a physical structural block diagram of a device for data transmission according to some embodiments of the present disclosure. For example, the device 800 may be a mobile phone, a computer, a digital broadcast terminal, a messaging device, a game console, a tablet device, medical equipment, fitness equipment, a personal digital assistant, and the like.

As illustrated in FIG. 8, the device 800 may include one or more of the following components: a processing component 801, a memory 802, a power supply component 803, a multimedia component 804, an audio component 805, an input/output (I/O) interface 806, a sensor component 807, and communication component 808.

The processing component 801 generally controls overall operation of the device 800, such as operation associated with display, phone calls, data communication, a camera, and recording. The processing component 801 may include one or more processors 810 to execute instructions to complete all or part of the steps of the above method. In addition, the processing component 801 may also include one or more modules to facilitate interaction of the processing component 801 with other components. For example, the processing component 801 may include a multimedia module to facilitate interaction of the multimedia component 804 with the processing component 801.

The memory 810 is configured to store various types of data to support operations in the device 800. Examples of such data include instructions of any application or method for operating on the device 800, contacts data, phone book data, messages, pictures, videos, or the like. The memory 802 may be implemented by any type of volatile or non-volatile storage devices or combinations thereof, such as an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 803 provides power for various components of the device 800. The power supply component 803 may include a power management system, one or more power supplies, and other components associated with generating, managing, and distributing power for the device 800.

The multimedia component 804 includes a screen that provides an output interface between the device 800 and a user. In some embodiments, the screen may include a liquid crystal display (LCD) and a touch panel (TP). In some embodiments, organic light-emitting diode (OLED) or other types of displays can be employed. If the screen includes a touch panel, the screen may be implemented as a touch screen to receive input signals from the user. The touch panel includes one or more touch sensors to sense touch, sliding, and gestures on the touch panel. The touch sensor may not only sense the boundary of a touch or slide action, but may also detect the duration and pressure related to the touch or slide operation. In some embodiments, the multimedia component 804 includes a front camera and/or a rear camera. When the device 800 is in an operating mode, such as a shooting mode or a video mode, the front camera and/or the rear camera can receive external multimedia data. Each front camera and/or rear camera may be a fixed optical lens system or have focal length and optical zoom capabilities.

The audio component 805 is configured to output and/or input audio signals. For example, the audio component 805 includes a microphone (MIC). When the device 800 is in an operating mode, such as a call mode, a recording mode, and a voice recognition mode, the microphone is configured to receive external audio signals. The received audio signal can be further stored in the memory 810 or sent via the communication component 808. In some embodiments, the audio component 805 further includes a speaker for outputting audio signals.

The I/O interface 806 provides an interface between the processing component 801 and a peripheral interface module. The peripheral interface module may be a keyboard, a click wheel, a button, or the like. These buttons may include but are not limited to: a home button, a volume button, a start button, and a lock button.

The sensor component 807 includes one or more sensors for providing the device 800 with status assessment in various aspects. For example, the sensor component 807 may detect an on/off state of the device 800 and the relative positioning of components. For example, the components may be a display or a keypad of the device 800, and the sensor component 807 may also detect a position change of the device 800 or a component of the device 800, the presence or absence of contact between the user and the device 800, the orientation or acceleration/deceleration of the device 800, and a temperature change of the device 800. The sensor assembly 807 may include a proximity sensor configured to detect the presence of nearby objects when there is no physical contact. The sensor component 807 may also include a light sensor, such as a complementary metal oxide semiconductor (CMOS) or a charge coupled device (CCD) image sensor, for use in imaging applications. In some embodiments, the sensor component 807 may also include an acceleration sensor, a gyroscope sensor, a magnetic sensor, a pressure sensor, or a temperature sensor.

The communication component 808 is configured to facilitate wired or wireless communication between the device 800 and other devices. The device 800 can access a communication standard based wireless network, such as a Wi-Fi, a $2^{nd}$-generation (2G) network, a $3^{rd}$-generation (3G) network, a $4^{th}$-generation (4G) network, a $5^{th}$-generation (5G) network, or a combination thereof. In some embodiments of the present disclosure, the communication component 808 receives a broadcast signal or broadcast related information from an external broadcast management system via a broadcast channel. In some embodiments of the present disclosure, the communication component 808 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology or other technologies.

In some embodiments of the present disclosure, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, so as to perform the above methods.

In some embodiments of the present disclosure, also provided is a non-transitory computer-readable storage medium including instructions, such as a memory 802 including instructions. The instructions may be executed by the processor 810 of the device 800 to complete the above method. For example, the non-transitory computer-readable storage medium may be a read-only memory (ROM), a random access memory (RAM), a compact disc read-only memory (CD-ROM), a magnetic tape, a floppy disk, an optical data storage device, etc.

The non-transitory computer-readable storage medium can store instructions that, when executed by a processor of a mobile terminal, cause the mobile terminal to execute any method provided in the above embodiments.

Various embodiments of the disclosure can have one or more of the following advantages.

MTU sounding may be performed by sending a data packet during data transmission between the Bluetooth devices, so as to realize negotiation of an MTU between the two parties in interaction. An appropriate and stable MTU value is finally obtained as an applied value for the interaction between the two parties.

On one hand, sounding is performed through a data packet. In comparison to a solution that two parties directly inform MTUs of themselves to each other and take a smaller one of the MTUs as a final applied value of the MTU, whether a candidate value of an MTU can be successfully transmitted is directly verified during the sounding in the disclosure. The reliability of the applied value of the MTU is improved, and problems such as packet loss and communication interruption resulting from an unreliable MTU which is caused by a protocol compatibility problem between different data communication layers, actual performance changes of a device.

On the other hand, since channel quality may change during data transmission, the MTUs supported by both communication parties may also change. According to the technical solutions of the embodiments of the disclosure, during data transmission of Bluetooth devices, MTU sounding may be performed at any time, and data size of data transmission can be adjusted, thereby preventing decrease of data transmission quality caused by instability of channel quality.

The various device components, portions, units, blocks, or portions may have modular configurations, or are composed of discrete components, but nonetheless can be referred to as "portions" in general. In other words, the "components," "portions," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for data transmission, applied to a first electronic device and comprising:
   during Bluetooth communication, negotiating, by transmitting a sounding data packet at a data size which is a candidate value of a maximum transmission unit (MTU), with a second electronic device about an applied value of the MTU for the Bluetooth communication,
   wherein the negotiating, by transmitting the sounding data packet at the data size which is the candidate value of the MTU, with the second electronic device about the applied value of the MTU for the Bluetooth communication comprises:
   sending, according to the candidate value of the MTU, the sounding data packet for the Bluetooth communication to the second electronic device;
   receiving a feedback data packet from the second electronic device within a preset period of time;
   in response to that a data size of the received feedback data packet is equal to that of the sounding data packet, determining the candidate value of the MTU to be the applied value of the MTU for the Bluetooth communication between the first electronic device and the second electronic device;
   decrementing the candidate value of the MTU, in response to receiving no feedback data packet at a data size which is equal to that of the sounding data packet;
   according to the decremented candidate value of the MTU, continuing to negotiate, by transmitting a sounding data packet at a data size which is the decremented candidate value of the MTU, with the second electronic device about the applied value of the MTU for the Bluetooth communication; and
   stopping negotiation of the MTU, in response to receiving, from the second electronic device, the feedback data packet at the data size which is equal to that of the sounding data packet, or in response to that the candidate value has been decremented to a minimum candidate value of the MTU.

2. The method of claim 1, wherein the decrementing the candidate value of the MTU, in response to receiving no feedback data packet at a data size which is equal to that of the sounding data packet comprises:
   in response to receiving, from the second electronic device within the preset period of time, a feedback data packet at a data size which is different from that of the sounding data packet, decrementing the candidate value of the MTU according to the data size of the feedback data packet; or
   in response to receiving, from the second electronic device within the preset period of time, a feedback data packet at a data size which is different from that of the sounding data packet, decrementing the candidate value of the MTU according to a first predetermined adjustment value.

3. The method of claim 1, wherein the decrementing the candidate value of the MTU, in response to receiving no feedback data packet at a data size which is equal to that of the sounding data packet comprises:
   in response to receiving no feedback data packet from the second electronic device within the preset period of time, decrementing the candidate value of the MTU according to a second predetermined adjustment value.

4. The method of claim 1, wherein the negotiating, by transmitting the sounding data packet at the data size which is the candidate value of the MTU, with the second electronic device about the applied value of the MTU for the Bluetooth communication further comprises:
in response receiving no feedback data packet at a data size which is equal to that of the sounding data packet, determining a minimum candidate value to be the applied value of the MTU.

5. The method of claim 1, wherein during the Bluetooth communication, the negotiating, by transmitting the sounding data packet at the data size which is the candidate value of the MTU, with the second electronic device about the applied value of the MTU for the Bluetooth communication comprises:
after data transmission is initiated in the Bluetooth communication, negotiating with the second electronic device about the applied value of the MTU for the Bluetooth communication, by transmitting, at a predetermined interval or at a moment when the data transmission is suspended, the sounding data packet at the data size which is the candidate value of the MTU.

6. A non-transitory computer-readable storage medium having computer-executable instructions stored thereon for execution by a processor to implement steps of the method for data transmission of claim 1.

7. A method for data transmission, applied to a second electronic device and comprising:
during Bluetooth communication, receiving a sounding data packet for the Bluetooth communication, wherein the sounding data packet is sent by a first electronic device according to a candidate value of a maximum transmission unit (MTU); and
sending a feedback data packet to the first electronic device according to a data size of the sounding data packet, wherein the feedback data packet is used for the first electronic device to determine an applied value of the MTU,
wherein the sending the feedback data packet to the first electronic device according to the data size of the sounding data packet comprises:
determining whether the data size of the sounding data packet is equal to a predetermined MTU of the second electronic device;
in response to that the data size of the sounding data packet is equal to the predetermined MTU, sending, to the first electronic device, the feedback data packet at a data size which is equal to that of the sounding data packet, wherein the feedback data packet is used for the first electronic device to determine the candidate value of the MTU as the applied value of the MTU for the Bluetooth communication between the first electronic device and the second electronic device; and
in response to that the data size of the sounding data packet is different from the predetermined MTU, sending, to the first electronic device, the feedback data packet at a data size which is smaller than or equal to that of the sounding data packet.

8. A device for data transmission, applied to a second electronic device and comprising:
a processor; and
memory for storing instructions executable by the processor;
wherein the processor is configured to:
during Bluetooth communication, receive a sounding data packet for the Bluetooth communication, wherein the sounding data packet is sent by a first electronic device according to a candidate value of a maximum transmission unit (MTU); and
send a feedback data packet to the first electronic device according to a data size of the sounding data packet, wherein the feedback data packet is used for the first electronic device to determine an applied value of the MTU,
wherein the processor is further configured to:
determine whether the data size of the sounding data packet is equal to a predetermined MTU of the second electronic device;
in response to that the data size of the sounding data packet is equal to the predetermined MTU, send, to the first electronic device, the feedback data packet at a data size which is equal to that of the sounding data packet, wherein the feedback data packet is used for the first electronic device to determine the candidate value of the MTU as the applied value of the MTU for the Bluetooth communication between the first electronic device and the second electronic device; and
in response to that the data size of the sounding data packet is different from the predetermined MTU, send, to the first electronic device, the feedback data packet at a data size which is smaller than or equal to that of the sounding data packet.

9. A device for data transmission, applied to a first electronic device and comprising:
a processor; and
memory for storing instructions executable by the processor;
wherein the processor is configured to: during Bluetooth communication, negotiate, by transmitting a sounding data packet at a data size which is a candidate value of a maximum transmission unit (MTU), with a second electronic device about an applied value of the MTU for the Bluetooth communication,
wherein the processor is further configured to:
send, according to the candidate value of the MTU, the sounding data packet for the Bluetooth communication to the second electronic device;
receive a feedback data packet from the second electronic device within a preset period of time;
in response to that a data size of the received feedback data packet is equal to that of the sounding data packet, determine the candidate value of the MTU to be the applied value of the MTU for the Bluetooth communication between the first electronic device and the second electronic device;
decrement the candidate value of the MTU in response to receiving no feedback data packet at a data size which is equal to that of the sounding data packet;
according to the decremented candidate value of the MTU, continue to negotiate, by transmitting a sounding data packet at a data size which is the decremented candidate value of the MTU, with the second electronic device about the applied value of the MTU for the Bluetooth communication; and
stop negotiation of the MTU, in response to receiving, from the second electronic device, the feedback data packet at the data size which is equal to that of the sounding data packet, or in response to that the candidate value has been decremented to a minimum candidate value of the MTU.

10. The device of claim 9, wherein the processor is further configured to:

in response to receiving, from the second electronic device within the preset period of time, a feedback data packet at a data size which is different from that of the sounding data packet, decrement the candidate value of the MTU according to the data size of the feedback data packet; or in response to receiving, from the second electronic device within the preset period of time, a feedback data packet at a data size which is different from that of the sounding data packet, decrement the candidate value of the MTU according to a first predetermined adjustment value.

11. The device of claim 9, wherein the processor is further configured to:

in response to receiving no feedback data packet from the second electronic device within the preset period of time, decrement the candidate value of the MTU according to a second predetermined adjustment value.

12. The device of claim 9, wherein the processor is further configured to:

in response receiving no feedback data packet at a data size which is equal to that of the sounding data packet, determine a minimum candidate value to be the applied value of the MTU.

13. The device of claim 9, wherein the processor is further configured to:

after data transmission is initiated in the Bluetooth communication, negotiate with the second electronic device about the applied value of the MTU for the Bluetooth communication, by transmitting, at a predetermined interval or at a moment when the data transmission is suspended, the sounding data packet at the data size which is the candidate value of the MTU.

* * * * *